US012597361B2

(12) United States Patent
Boudville

(10) Patent No.: US 12,597,361 B2
(45) Date of Patent: Apr. 7, 2026

(54) DETERRING SEXUAL HARASSMENT OF AVATARS IN VIRTUAL REALITY

(71) Applicant: Wesley John Boudville, Perth (AU)

(72) Inventor: Wesley John Boudville, Perth (AU)

(73) Assignee: Wesley John Boudville, Perth (AU)

( * ) Notice: Subject to any disclaimer, the term of this patent is extended or adjusted under 35 U.S.C. 154(b) by 469 days.

(21) Appl. No.: 17/803,559

(22) Filed: Aug. 30, 2022

(65) Prior Publication Data

US 2024/0066409 A1 Feb. 29, 2024

(51) Int. Cl.
*G09B 9/00* (2006.01)

(52) U.S. Cl.
CPC ...................................... *G09B 9/00* (2013.01)

(58) Field of Classification Search
CPC ....................................................... G09B 9/00
See application file for complete search history.

(56) References Cited

U.S. PATENT DOCUMENTS

| | | | |
|---|---|---|---|
| 8,827,816 B2 | 9/2014 | Bhogal et al. | |
| 10,627,983 B2 | 4/2020 | Bates et al. | |
| 10,679,411 B2 | 6/2020 | Ziman | |
| 11,853,470 B2 | 12/2023 | Boudville | |
| 2007/0150340 A1* | 6/2007 | Cartmell | ................ G06Q 30/02 |
| | | | 705/14.66 |

| | | | |
|---|---|---|---|
| 2007/0162862 A1* | 7/2007 | Ogasawara | ............. H04L 43/00 |
| | | | 715/745 |
| 2009/0174702 A1 | 7/2009 | Garbow et al. | |
| 2013/0288788 A1 | 10/2013 | Lim et al. | |
| 2016/0279522 A1 | 9/2016 | De Plater et al. | |
| 2016/0283096 A1* | 9/2016 | Yao | ..................... G06F 3/04847 |
| 2018/0154106 A1 | 6/2018 | Sánchez Vives et al. | |
| 2021/0327140 A1 | 10/2021 | Rothkopf et al. | |
| 2022/0345537 A1 | 10/2022 | Samms et al. | |
| 2022/0351281 A1 | 11/2022 | Morgan et al. | |
| 2023/0297162 A1 | 9/2023 | Boudville | |
| 2024/0061544 A1 | 2/2024 | Boudville | |

OTHER PUBLICATIONS

Wikipedia contributors, "Psychedelia," Wikipedia, The Free Encyclopedia, https://en.wikipedia.org/w/index.php?title=Psychedelia&oldid=1253637978 (accessed Oct. 31, 2024). (Year: 2024).*
Tate Gallery, Psychedelic Art, https://www.tate.org.uk/art/art-terms/p/psychedelic-art#:~:text=Day%2Dglo%20and%20anti%2Dnaturalistic,hippy%20community%20in%20San%20Francisco, Accessed 2024 (Year: 2024).*

(Continued)

*Primary Examiner* — Kang Hu
(74) *Attorney, Agent, or Firm* — Steinfl + Bruno LLP

(57) ABSTRACT

Systems and methods of anti-sexual harassment in Virtual Reality can be realized by clickable links positioned on regions of an avatar defined as "off-limits". An avatar lets a region of its surface be clickable. When a second avatar touches the region, the second avatar is sent to another VR site, which can be playing disorienting images and cacophonous sound. The first avatar can be a stripper, lap dancer or taxi dancer. She can define her bra and panties as off limits. Or she defines her vagina, anus and mouth off limits.

9 Claims, 10 Drawing Sheets

Susan 4a1

4a2

4a3

Tim 4a4

Rahul
4a5

(56)        References Cited

OTHER PUBLICATIONS

Wikipedia contributors, "Psychedelic drug," Wikipedia, The Free Encyclopedia, https://en.wikipedia.org/w/index.php?title=Psychedelic_drug&oldid=1250047981 (accessed Oct. 31, 2024). (Year: 2024).*

Basu, T. , "The Metaverse Has a Groping Problem Already," MIT Tech Review, Dec. 16, 2021; https://www.technologyreview.com/2021/12/16/1042516/the-metaverse-has-a-groping-problem/.

Elias, M., "Harassment and abuse in three dimensions, the darkside of the Metaverse," SBS News, Mar. 20, 2022, https://www.sbs.com.au/news/the-feed/article/harassment-and-abuse-in-three-dimensions-the-dark-side-of-the-metaverse/n8f543rha.

Final Office Action for U.S. Appl. No. 17/803,375, filed Jun. 6, 2022 on behalf of Wesley John Boudville. Mailed Mar. 5, 2024. 40 pages.

Kearns, S., "Meta Introduces 'Personal Boundaries' in 'Horizon Worlds' and 'Venues' to Prevent Harassment," Hypebeast, Feb. 5, 2022, https://hypebeast.com/2022/2/meta-personal-boundary-horizon-worlds-venues.

Metz, R., "Harassment is a problem in VR, and it's likely to get worse," CNN Business, May 5, 2022, https://www.cnn.com/2022/05/05/tech/virtual-reality-harassment/index.html.

Petkov, M., "The Social Metaverse and its Impact on the Future of Society" LinkedIn, Feb. 24, 2023, https://www.linkedin.com/pulse/social-metaverse-its-impact-future-society-martin-petkov/.

Shen, M., "Sexual harassment in the metaverse? Woman alleges rape in virtual world," USA Today, Jan. 31, 2022, https://www.usatoday.com/story/tech/2022/01/31/woman-allegedly-groped-metaverse/9278578002/.

Siu, A. "Women',s Avatars are Being Sexually Assulted in Mark Zuckerberg's Metaverse Platforms," The Wrap, May 26, 2022, https://www.yahoo.com/entertainment/women-avatars-being-sexually-assaulted-182436343.html.

Soon, W., "A researcher's avatar was sexually assaulted on a metaverse platform owned by Meta, making her the latest victim of sexual abuse on Meta's platforms, watchdog says," Business Insider, May 30, 2022, https://www.businessinsider.com/researcher-claims-her-avatar-was-raped-on-metas-metaverse-platform-2022-5.

Stieb, M., "Mark Zuckerberg's Metaverse Has a Groping Problem", NY Mag Intelligencer, Feb. 4, 2022, https://nymag.com/intelligencer/2022/02/mark-zuckerbergs-metaverse-has-a-groping-problem.html.

* cited by examiner

Site B

Site A

Figure 1   Avatar wears clickable link

Figure 2   Girl's top is a clickable link

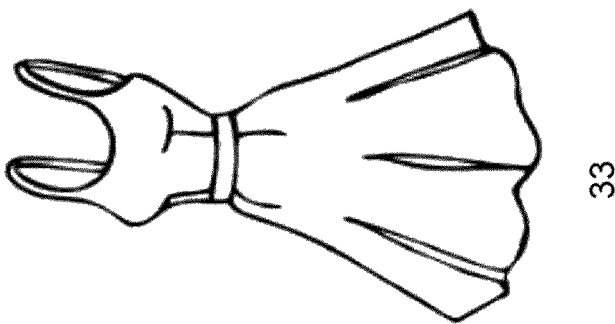
33
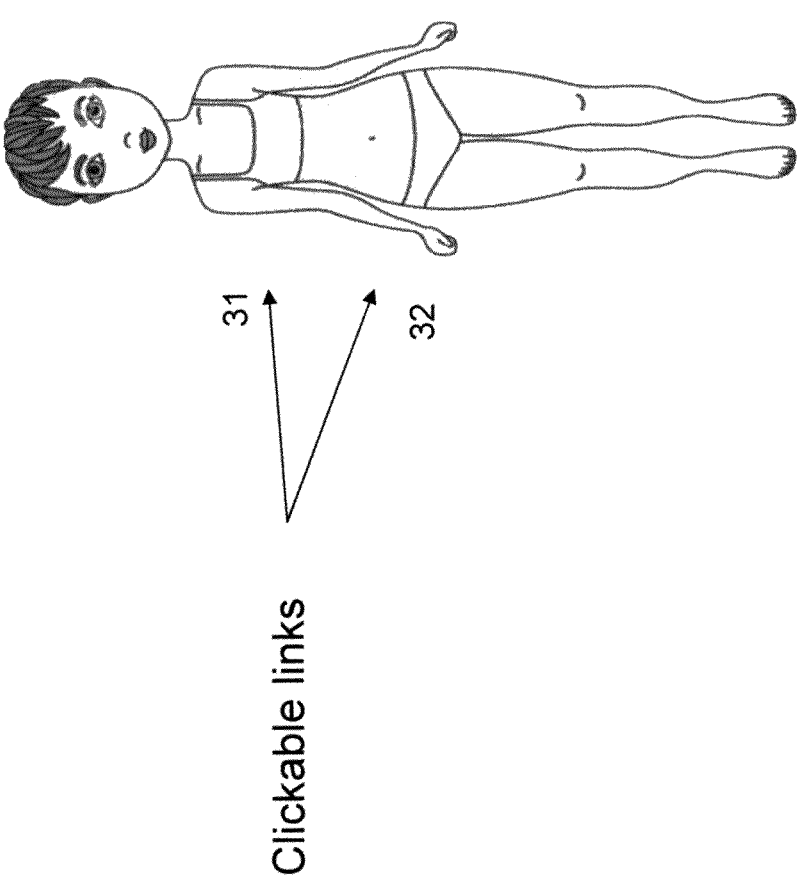
31
32
Clickable links
Figure 3

Undesirable
Site D

43

Vagina 42

Insert

41

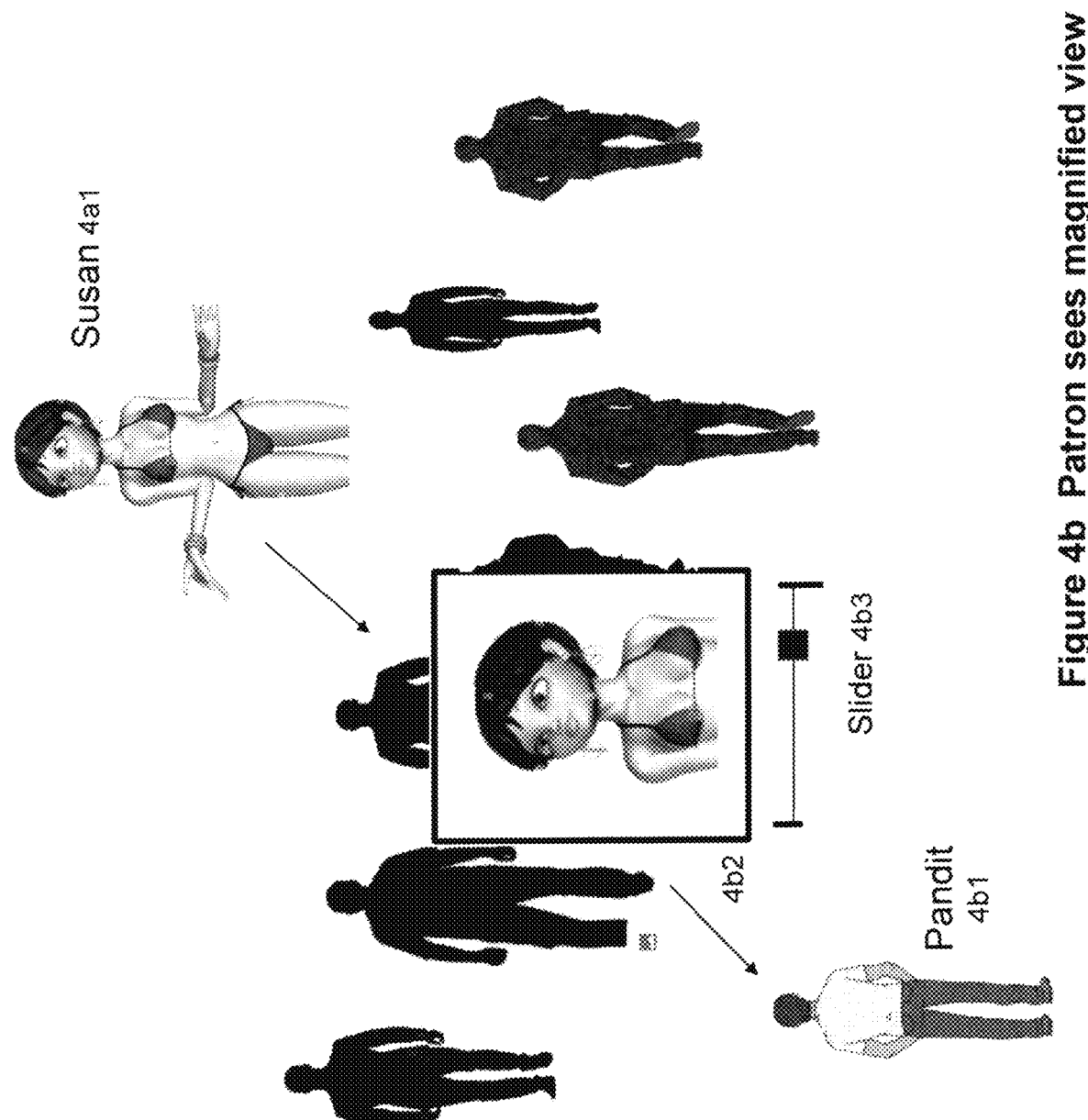
Figure 4b  Patron sees magnified view

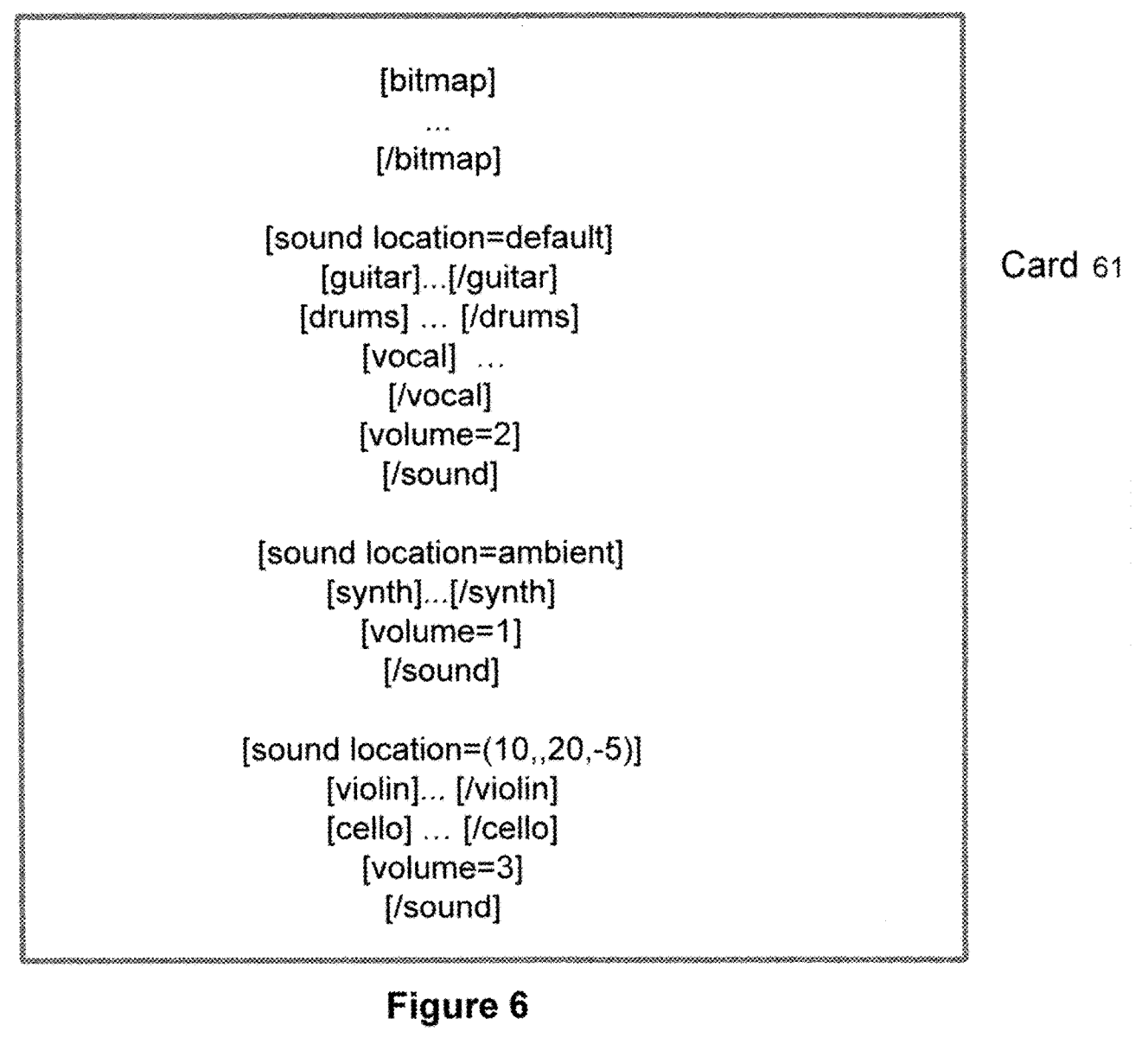

Card 61

[bitmap]
...
[/bitmap]

[sound location=default]
[guitar]...[/guitar]
[drums] ... [/drums]
[vocal] ...
[/vocal]
[volume=2]
[/sound]

[sound location=ambient]
[synth]...[/synth]
[volume=1]
[/sound]

[sound location=(10,,20,-5)]
[violin]... [/violin]
[cello] ... [/cello]
[volume=3]
[/sound]

Figure 6

DETERRING SEXUAL HARASSMENT OF AVATARS IN VIRTUAL REALITY

BACKGROUND

Recently, FACEBOOK Corp (which now has parent META Corp) discovered a problem with sexual harassment on its VR site. A female user accused other users of using their avatars to surround her avatar at close distance. This included unwanted touching of her avatar. Facebook's reply was to impose a transparent barrier around each avatar on its site. This was a "personal boundary". It limits avatars to a first bump or high five. META suggested that in the future, when users are more comfortable with each other, this might be relaxed.

There have been other accounts of women being harassed, and their avatars "raped" in VR sites. It was suggested that this problem will not go away as the Metaverse grows.

FIGURES

FIG. 3 shows an avatar with bra and panties as clickable links.

Figure 4:
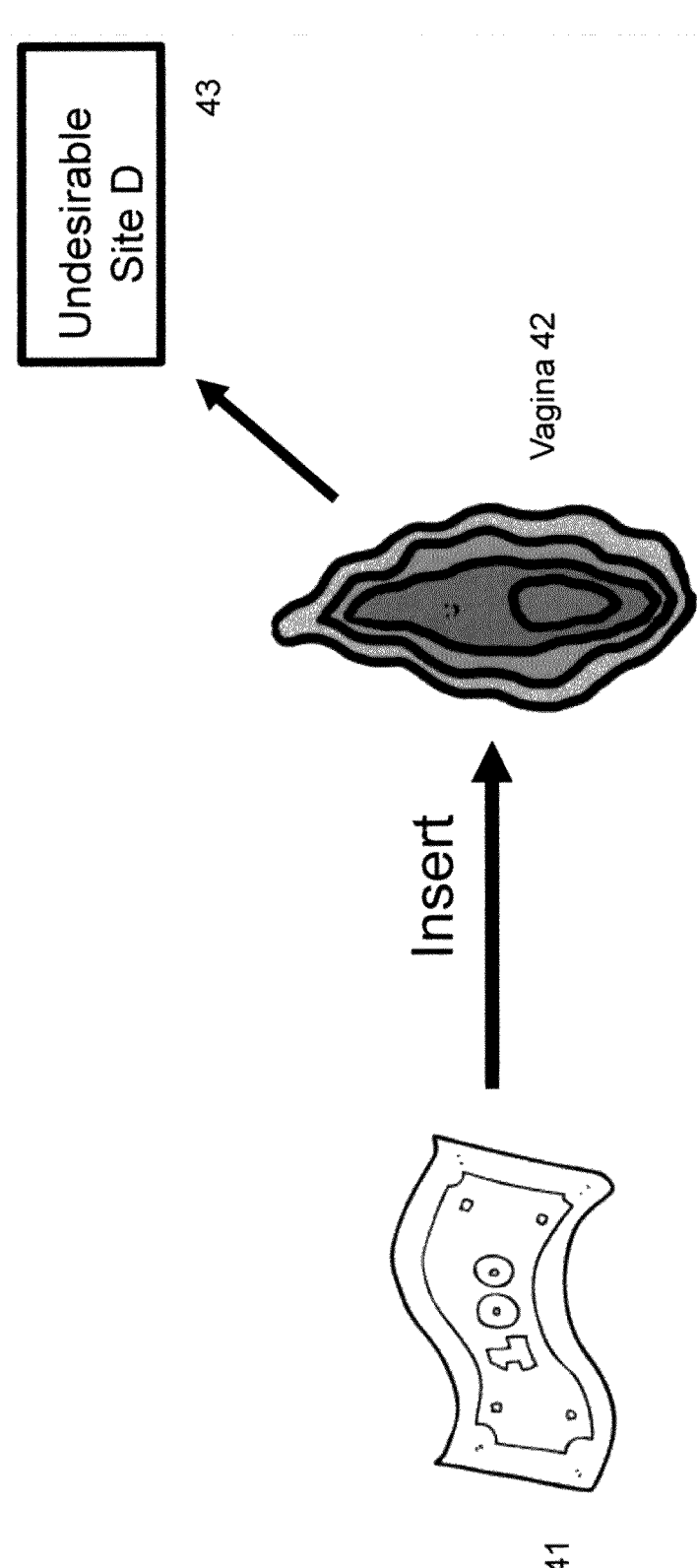
FIG. 4 shows a virtual dollar being inserted into a virtual vagina.
Figure 4A:
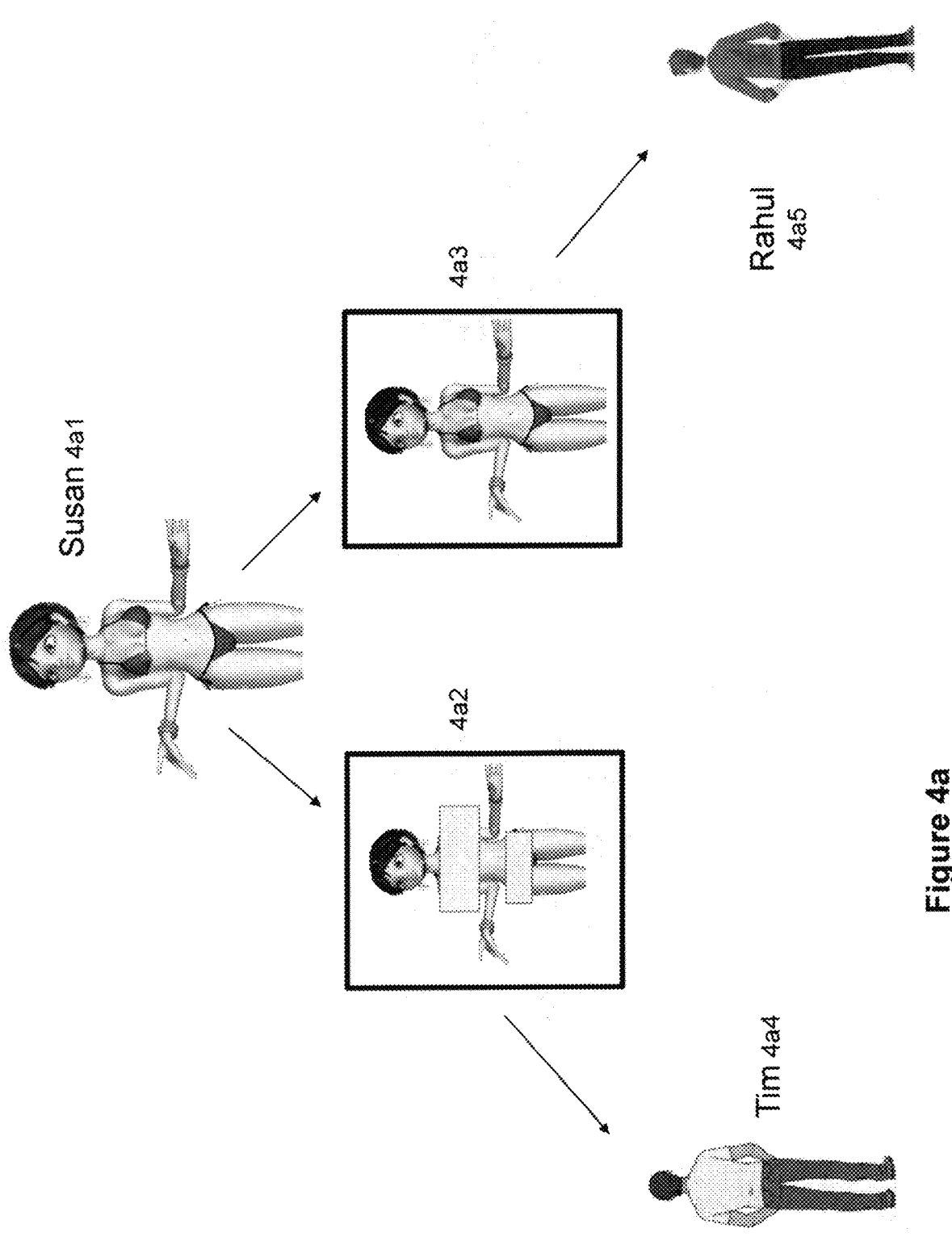

FIG. 4*a* shows a virtual dancer in front of 2 patrons.

FIG. 4*b* shows a dancer in front of a crowd, and a patron sees a magnified view.

Figure 5:
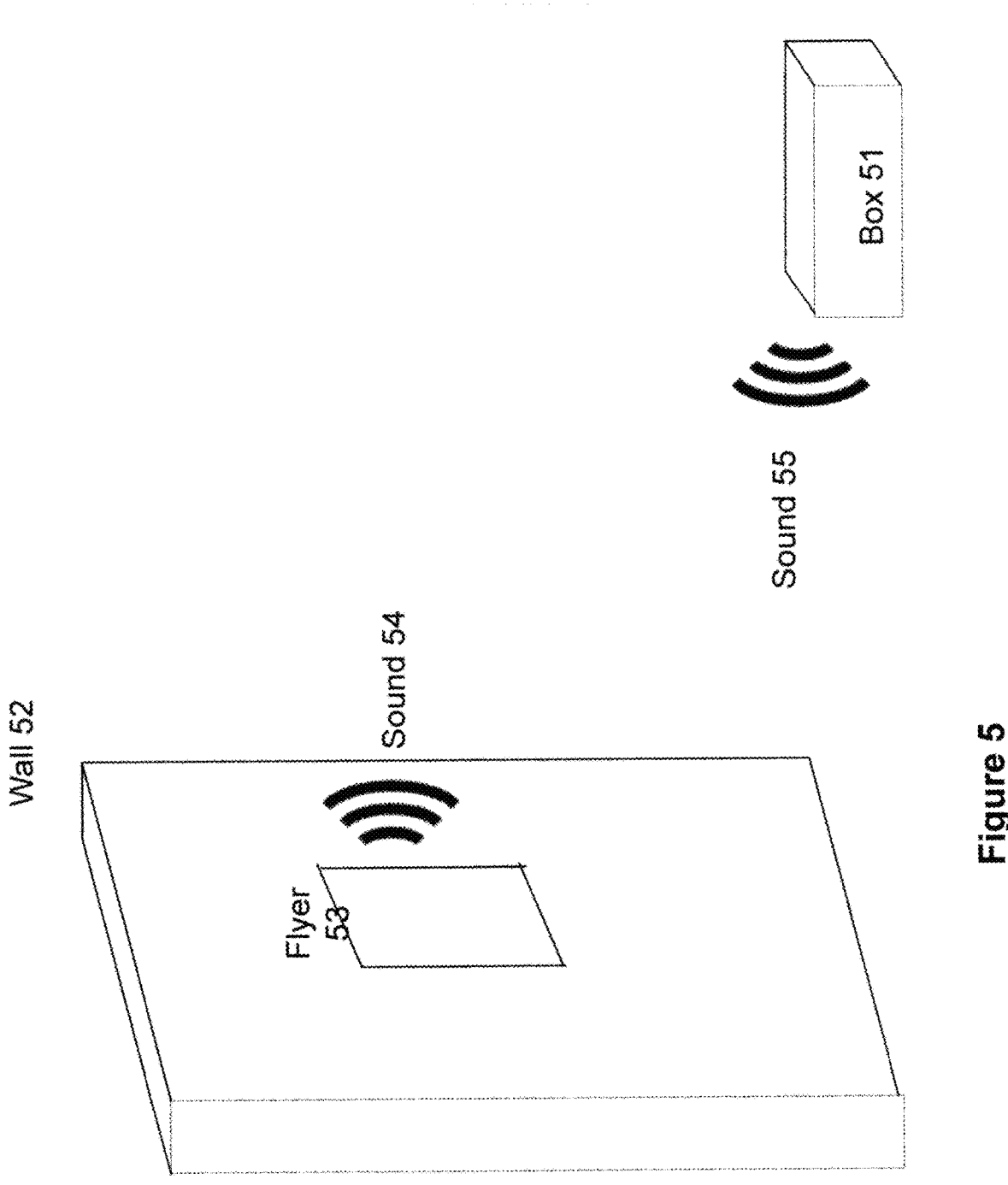

FIG. 5 shows sound associated with a flyer on a VR wall.

FIG. 6 shows a virtual card with audio instructions.

Figure 7:
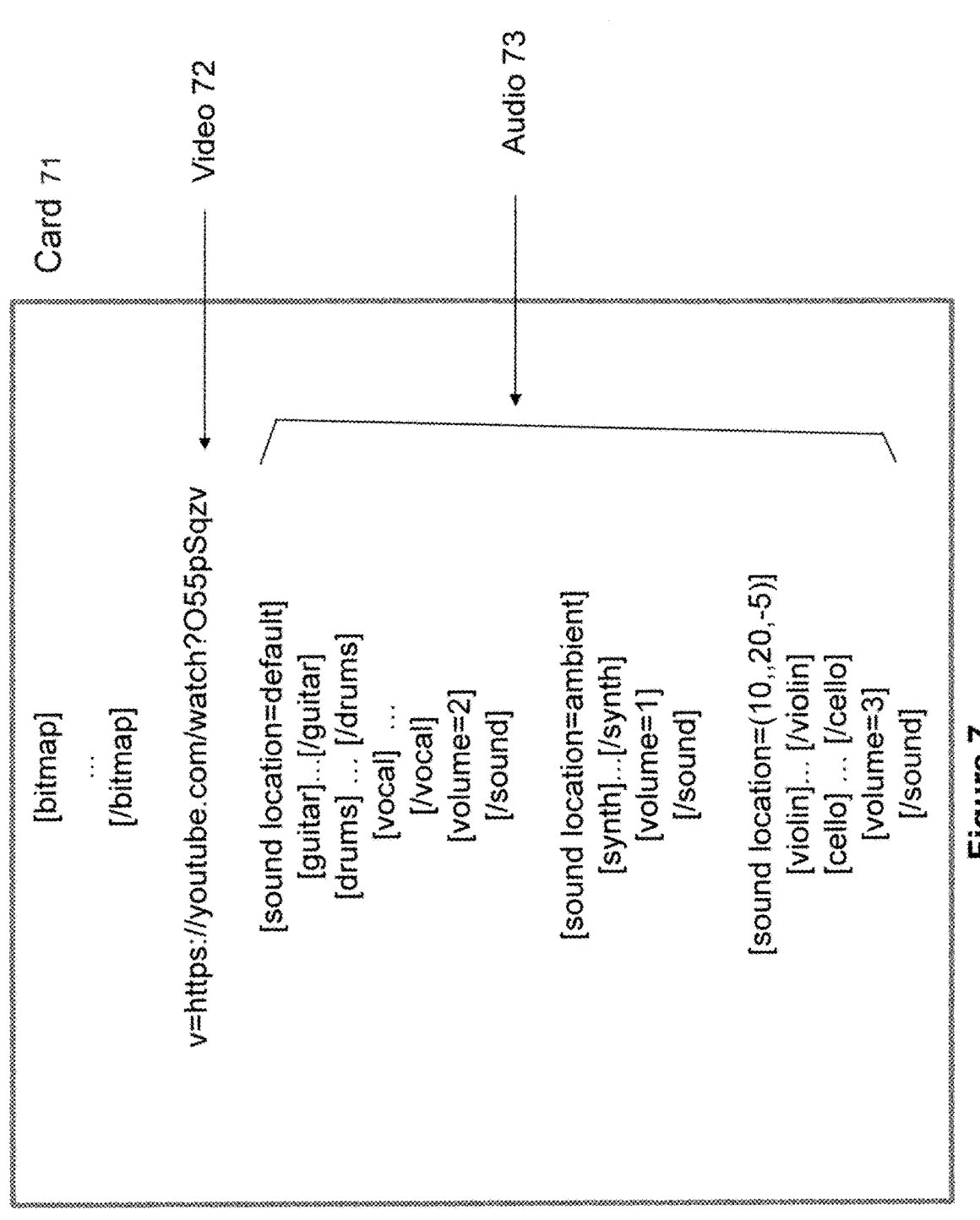

FIG. 7 shows a virtual card with audio and video instructions.

Figure 8:
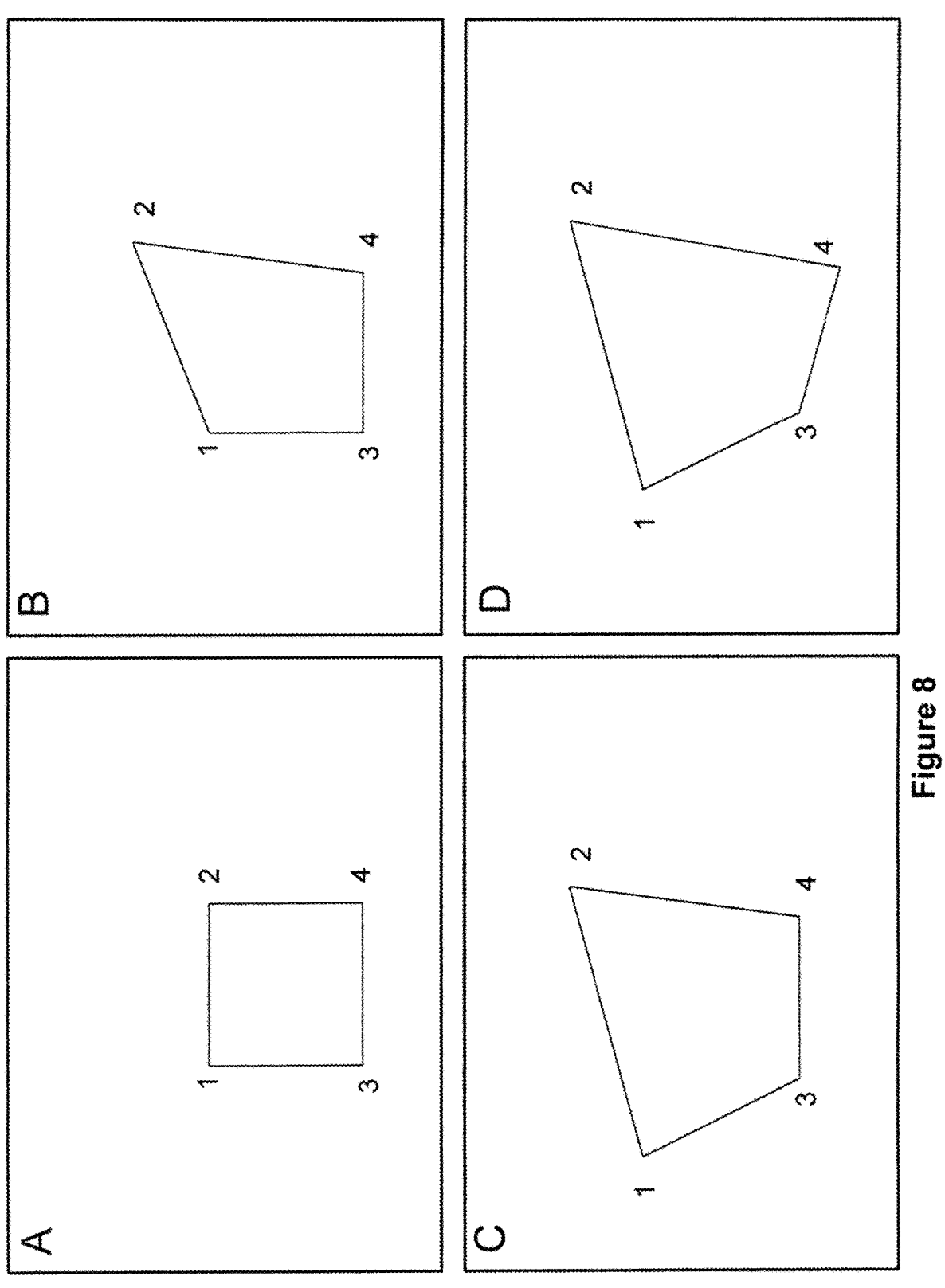

FIG. 8 shows a virtual card being stretched.

DETAILED DESCRIPTION

What we claim as new and desire to secure by letters patent is set forth in the following. This application has the sections:

0] Definition of Metaverse;
1] Previous work;
2] Current work;
2.1] Specific patrons;
2.2] Blurring;
2.3] Zooming in;
2.4] informal avatars;
2.5] Gender neutral;
3] Leaving links in a site;
3.0] Hardware simulations;
3.1] Link interpreted by VR site;
3.2] Link interpreted by external server;
3.2.1] External server is a clock;
3.2.2] External server has passwords;
4] Variations;

0] Definition of Metaverse;

We take a simple definition of the Metaverse to be Virtual Reality (VR) plus the use of avatars. Others have devised more elaborate schemes, but we chose the simplest case.

Figure 1:
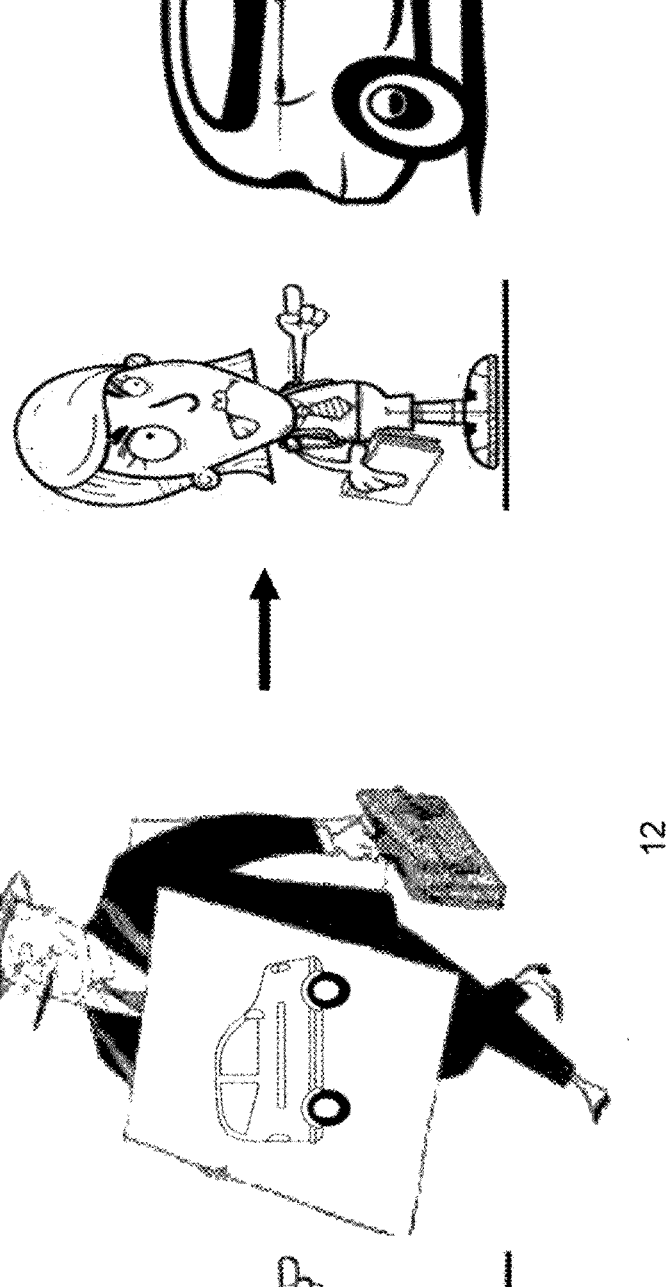
FIG. 1 shows an avatar near another avatar wearing a clickable link

1] Previous Work;

FIG. 1 shows a female avatar 11 near a male avatar 12. They are in a VR site A. He wears a sandwich board showing an image of a car. The image is a clickable link, like how in conventional HTML, a link can be an image instead of text. In an earlier application, "Metaverse avatar wearing a clickable link", filed 21 Mar. 2022, Ser. No. 17/803,218, we described this. Suppose avatar 11 touches the image of the car. This sends her to VR site B, where she sees a life size copy of the car.

This application follows on from a recent application, "Metaverse antirape measures", filed 6 Jun. 2022, Ser. No. 17/803,375. That application described 2 anti rape measures.

First. The owner of an avatar can hire a virtual bodyguard. They share her avatar. She lets him see the FOV of the avatar. Which she is already seeing. She controls her avatar. But if a predator avatar (or a suspected one) approaches, she hands control of her avatar to her bodyguard. Now she can only watch thru her avatar's eyes. He controls the avatar and uses it to beat up the predator.

Second. The owner of the avatar wears and walks it. When a predator avatar nears, she flips a switch. Her avatar becomes stronger and faster. She uses it to bear up the predator.

2] Current Work;

In entertainment, there are strippers, lap dancers and taxi dancers. These are usually women who entertain men. Most of the women are not prostitutes. But most if not all encounter sexual harassment in their work. In the development of VR and the Metaverse, there can also be avatars that are strippers, lap dancers and taxi dancers. They are very likely to also be sexually harassed. We describe here methods of using technology in VR/Metaverse to reduce sexual harassment.

Many might declaim the women's choice of professions. But these are legally valid professions and the women pay taxes and support themselves and their families. They are entitled to the protections offered in this application.

We define the predator as a male "Creep". And the potential victim as Jody. These are avatars, controlled by humans. In general, we shall call the human potential victim also Jody. Likewise with the Creep. It should be clear when we refer to an entity, whether it is an avatar or a human.

Figure 2:
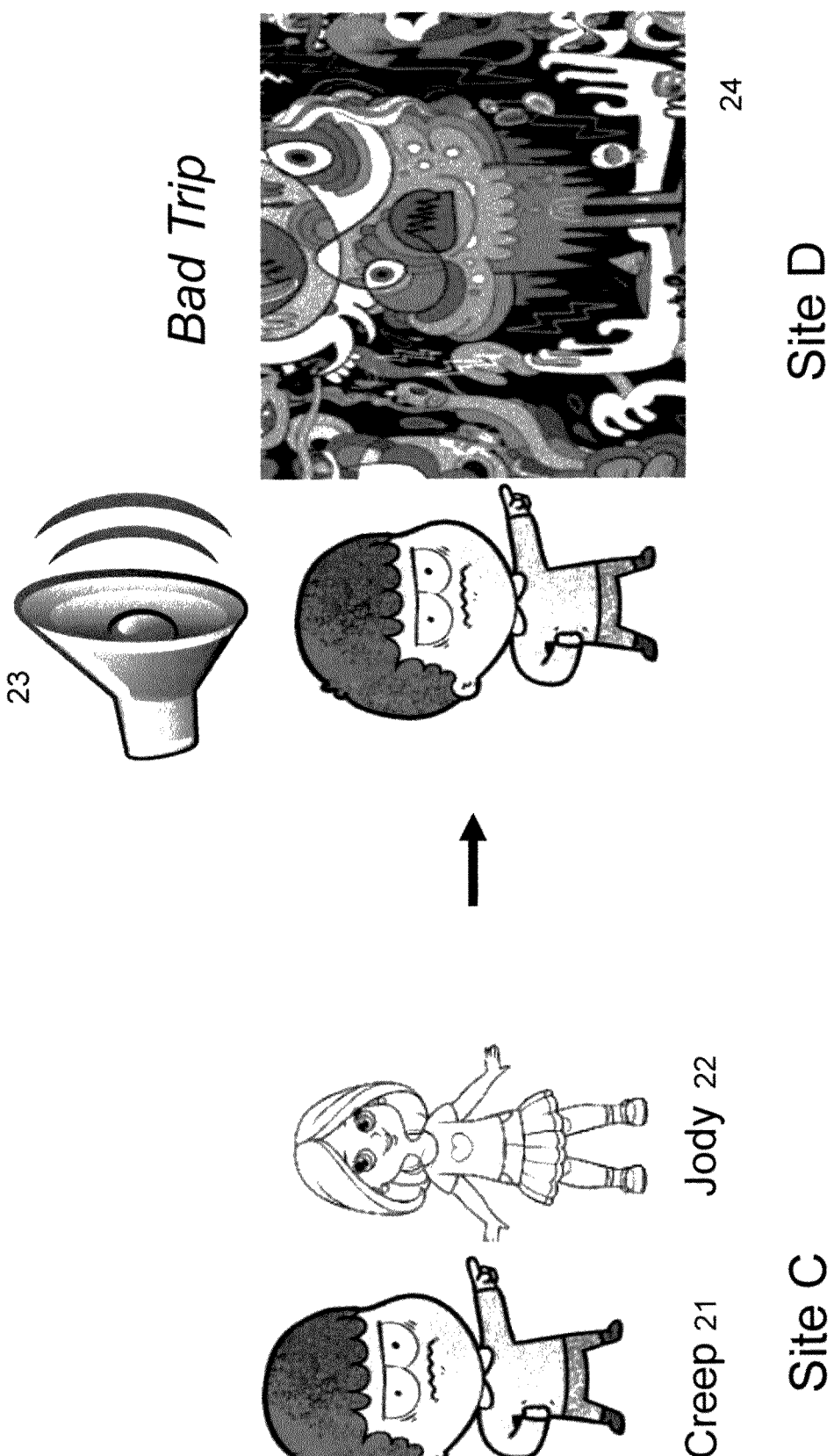
FIG. 2 shows a Creep avatar accosting a female avatar.

See FIG. 2. It shows Creep 21. He is near intended victim Jody 22. He uses his arm to grope her breasts. But now Jody has implemented her blouse so that it is clickable. She deliberately is looking for a predator. When he gropes her, this is like him clicking a conventional web link. He is transported to VR site D. Here a cacophonous sound 23 is playing. Think for example of the famous scene in the Jaws movie of fingernails on a blackboard. (https://www.youtube-.com/watch?v=L0ehUI8Cghw). The sound would be played at the highest volume possible on the predator's VR rig. But it does not have to be heavy metal loud. That example from Jaws illustrates that a medium volume suffices.

Plus, a psychedelic-type visual display 24 appears on the site. This introduces dis-equilibrium and possibly nausea.

The combination of a repulsive sound and visuals act as punishment. Hopefully dissuading him from accosting others.

Jody can also define her entire outside surface as clickable.

Another variant can be useful. Consider when human Jody makes an avatar. It can wear a skirt. Under the skirt, the avatar has underwear. Jody can define the clothes so that another avatar can touch or caress the outside of the skirt. Under some circumstances, that could be acceptable (or even desirable) to her. But Jody can define her underwear with a clickable link that points to the undesirable destination D. Her reasoning is that another avatar that puts his hand under her skirt and on her underwear is going too far. FIG. 3 shows an avatar with bar 31 and panties 32 as clickable links. The dress 33 goes over the underwear. Dress 33 has no clickable links.

An elaboration is where she does not make her bra and panties clickable. Like the dress. But she makes the breasts under the bra clickable. And her groin and buttocks under her panties are clickable. She is essentially saying that another avatar can go further. He can grope her covered breasts. But he cannot put his hand under her bra.

This can be generalised. Her avatar can have several layers of clothes. Jody can define a layer (eg one or more of stockings, bra, bralette, panties, pasties) that is off limits, simply by making these clickable links to destination D. This can be useful in a VR situation where, for example, an avatar is a stripper. In real life, a stripper might wear multiple items of underwear, that she slowly removes. In VR, ditto. But now the avatar can make the lowest level of underwear have that undesired link.

Consider for example a VR stripper wearing a bra and under the bra, pasties. Another avatar, Bob, removes the bra. He discovers the pasties. If he tries to remove these, he gets banished to destination D.

In the real world, there are also lap dancers and taxi dancers. These have VR equivalents. A lap dancer is like a stripper, but has only 1 client at a time. She and the client are alone in a private room. She undresses for him and dances naked. The room might have a panic button that she can access if need be. She bears more risk than a stripper in a room of men.

A taxi dancer keeps her clothes on. She works in a ballroom. She dances one on one with a male client. Typically the dance is a traditional one, where they are embraced. All this has VR analogs. During the dance, it is common that the man puts his hands under her blouse. Etc. She often tolerates this in the hope of a big tip.

Consider an anatomically correct, naked female avatar. Her vagina is defined and can be entered. But the inside can be defined as having a link to undesirable destination D. This enables the defining and deployment of such anatomically correct avatars. In the real world, when strippers perform, there are often bouncers nearby, to prevent male customers getting out of hand when strippers are naked.

The use of such links minimises the need in VR for some bouncers.

This begs the question. Why define the interior of a vagina in VR if it is never entered? One answer is that this can depend on the VR site. Each site can define whether a clickable link is implemented or not. And as VR verisimilitude improves, and VR dating becomes more common and realistic, there will be a (ahem) push for realistic vaginas. Currently, many VR avatars are like mannequins. But it can be expected that as VR improves, there will be incentive to make avatars more complete and realistic.

There is a second reason. In real world strip clubs, there is a scenario where when a stripper discloses her vagina, a patron can insert a dollar bill into it. In VR, a patron avatar can have a digital equivalent of a dollar bill. Our invention lets the patron avatar put the bill into the VR vagina, but prevents him from entering her with his fingers. FIG. 4 depicts a virtual bill 41 being inserted into a virtual vagina 42. FIG. 4 also shows an arrow pointing from vagina 42 to undesirable destination D 43. This arrow is what distinguishes the overall configuration of FIG. 4 from the real world analog. Because there is no analog of the arrow from vagina 42 to destination 43. He cannot put his digital penis or fingers into her vagina.

In VR, the deployment of a link to a stripper's or lap dancer's virtual vagina can give protection and deter predators in a new way, that has no analog to existing real world measures.

For a lap dancer, she might want to deter a client by similarly defining parts of her anatomy and underwear to be off limits thru linking them to undesirable destinations.

The discussion in this section about putting a link on a vagina also pertains to doing likewise with the anus, buttocks and mouth.

The above can also be extended to VR dating. A female avatar goes on a date with a male avatar. She can define what is "going too far". For example, she can put her bar and panties off limits using the above methods. Or she might just put her panties off limits.

Above discusses a female avatar run by a human owner. But it is possible that the avatar is automated. It is entirely a software construct. (A bot.) Why? Who is offended when a male avatar does something "untoward" to a bot? But ultimately the bot is constructed and conforms to some norms. It can be that in a given VR site, the bot is meant to elicit acceptable behavior from a male avatar patron. So avatar Jody will still have off limit regions.

2.1] Specific Patrons;

The entire earlier discussion was for a (female) avatar Jody that cannot distinguish between patrons. What if she can? When a link is triggered by a patron touching an inappropriate place, the executing of the link may be able to interrogate data about the patron.

Suppose when patrons enter the venue, some pay extra and get a code. And when such a patron touches a sensitive place with a link, his data tells the code to the link analysis. This lets the patron do certain acts. Other patrons lacking the code cannot.

To wit. Avatar patron Mike can touch Jody's bra and can remove it. This assumes the bra is defined so that removal is possible. Other patrons who attempt this are banished to destination D.

Or suppose the venue is mainly for lesbian customers. Here lesbian can mean in real life and for avatars. Though male customers are allowed. Patron Susie gets a code, as a lesbian. She can touch Jody's bra. But patron Ted cannot.

Or, instead of a code being used, the link software can find the patron's gender. This can be either "biological" gender or identity gender. Though in VR, biological gender can be ambiguous.

2.2] Blurring;

The reader is familiar with the evening news. Sometimes when cameras show a person, the face is deliberately out of focus in video from the cameras. In real life, others near that person can still see that person in full focus. Now consider VR. By the very definition of VR, the default is that users with a direct line of sight (LOS) to an avatar can see that avatar in focus. But because what users see comes thru video assembled by the site, this can be altered. Hence an avatar's owner can pay the VR site currently hosting the avatar, for the avatar to be out of focus, even to nearby avatars. This is a powerful feature that has no equivalent in real life. We call this blurring or fuzzying. It can be parlayed into deriving revenue for the avatar's owner and for the site.

Thus far, this section is independent of elsewhere in this application. But one local use case is where some avatars can pay (=their users pay) so they can see (eg) a stripper fully undress. While others only see blurs on the stripper when she does so.

FIG. 4a shows an example of dancer Susan 4a1 in front of virtual patrons Tim 4a4 and Rahul 4a5. Tim did not pay the "see all" fee. His view of her is redacted. Rahul paid the fee and his view shows more. The redacting of (eg) breasts and groin can be done using image recognition. Those methods are advanced enough that this should be possible in most circumstances.

Or, if Susan has defined areas on her with clickable links (as per earlier sections of this application) the site can use the existence of such areas to easily redact them, without needing image recognition.

The blurring is not necessarily of the stripper's breasts and groin. The blurring might be of the stripper's (virtual) face. To some patrons, seeing the face can be as important, if not more so, as seeing anything else. For example, to an audience of Muslim men using avatars, a woman's face is often forbidden to be seen in public. The enticement of being able to see the stripper's face can be incentive for the site and stripper to charge extra.

Thus a key variant is where a patron pays a fee and can see the face, breasts and groin when she undresses. Another patron pays a smaller fee, and can only see her breasts and groin. This uses the power of VR to focus on specific objects for specific viewers.

Another more sedate variant is where a stripper wears a dress and bra and panties. When she takes off her dress, avatars who have paid a fee can see her in bra and panties. While avatars who have not paid the fee will see a blurred figure.

This can be extended to acts depicting interactions between 2 or more avatars on a stage.

2.3] Zooming in;

Suppose there is an audience of avatars watching (eg) a stripper. As in real life, the line of sight (LOS) to the stripper could occasionally be blocked by other avatars. One answer is zooming in. This can be like the real life analog situation, where it is as though an avatar has a zoom camera. But now the zooming can occur via an avatar being able to see with a FOV that appears in front of him.

Going further. In the direction that the avatar is looking (LOS), a FOV scene appears. Even if his LOS is blocked by other avatars interposing themselves. The patron avatar is looking thru intervening avatars. There is no real life analog to this. The avatar might have 2 controls in its GUI. One is to fix the focal plane on which he is focusing. This is not the display plane in which he sees the enhanced images.

The second control is the magnification within that focal plane. A slider gadget can be used.

These zooming abilities can be obtained by paying a fee to the site. It gives a chance for the site to generate extra income.

The controls might be simplified, to aid use by avatars. There might be a virtual camera that locks in, close to the (in this case) stripper. It also simplifies the computational demands on the site, if many patrons pick this viewing option. FIG. 4b shows a stripper Susan 4a1 in front of a crowd. At the back is Pandit 4b1. Avatars in front of him block his view of her. But in his HUD, he summons screen 4b2 showing a magnified view of Susan. There is a slider 4b3 which lets him adjust the magnification. Here the magnified image is from a direct LOS to him. But this is not a necessity. The image he sees might be taken at a different angle. Because this is VR, he is not restricted to his LOS to her.

2.4] Informal Avatars;

Consider a female avatar performing in front of a crowd of mostly male avatars. She might be dancing. She is clothed; wearing a dress and underwear. As she dances the men have paid money to see her. Some paid a little more.

They can see her dancing in her underwear. This is possible because the site server has a copy of her naked image, plus images of her in her underwear. The server can ab initio construct an accurate simulation of her dancing in her underwear. Essentially, this is no more complex to do than the full simulation of her fully clothed and dancing. From a computational perspective, there is no fundamental difference between these images.

There is some extra workload on the server. It has to run 2 simulations—dressed and undressed. This per se justifies an extra charge for those avatars who want to see her in her underwear.

Going further, for another extra charge, an avatar can see her dance naked in his FOV that is delivered to him by the site.

2.5] Gender Neutral;

Most of the discussion used an example of a female performer and a male audience. But this can be extended to the case of a male performer in a straightforward manner.

3] Leaving Links in a Site;

A leitmotif of this application is that avatars can wear clickable links as the avatars move around. In earlier applications, we described how an avatar can do this. In this application we take the idea further. At the source code level, a link is associated with a bitmap or pixel map. The map can be part of the clothing or body of an avatar. Thus the "clothing" might be a rectangular piece of "paper" that the avatar pins onto a VR wall. This makes a link, with an associated image. The link and image being on a wall brings this implementation of the link to be equivalent to the conventional depictions of links in current VR/Metaverse cases.

An avatar can carry a bag of such cards (or cloths). As it walks thru a VR site, it can pin these cards onto various walls or bulletin boards. It can also give these cards/cloths to other avatars, for them to carry around and boost the advertising effect of the advertised destination. The avatars receiving the cards/clothes get compensated in some manner by the first avatar (who gave them the cards).

One type of card or cloth is where this cloth is pressed against the fabric of the avatar receiving the cloth. The pressing could be done by the receiving avatar or the donating avatar. The cloth has the property that when it is pressed onto the receiving avatar's outer surface, it sticks to that surface. Aka like a real world Post-it note.

This greatly aids the receiving avatar's owner's willingness to accept such a cloth.

For a card stuck onto a wall or a cloth stuck onto an avatar, both might have the property that the item comes with an expiration date. On that date the item will vanish. This reduces the visual pollution seen in real life, by flyers being worn out, defaced and clinging to billboards.

The expiration can be handled by the item being represented by a bitmap or pixel map, accompanied by some snippet of code. When the code is run by the VR site, in order to display the item, it checks the current time. If that is after a preset time written into the card, then the item is nullified. It no longer exists and is removed from the list of items in a site or associated with (stuck to) an avatar.

A caveat to the previous paragraph is where the VR site may keep the nullified item in a database of such items. Perhaps to enable a playback facility for forensic reasons. This database may be kept offline, to reduce runtime costs.

The functionality of such virtual cards or cloths can be expanded beyond just links.

A card can play sound. In the real world, this requires battery and speaker, and the card has to have some minimum thickness. But in VR the source code of the card just needs to have instructions (=executable steps) that are carried out by the CPU of the VR site.

The sound can come from the card or from any location. Unlike the real world, there is now no need for the sound to emanate from the virtual card. Though the latter is possible, where the VR site now localises the source of the sound to be the card. But in VR, the source can now be elsewhere. Plus the sound does not need to appear to come from one source, as monophonic sound. We can have stereophonic sound. Or quad sound.

FIG. 5 shows flyer 53 stuck to wall 52 in some VR site. From flyer 53 comes sound 54. This is not possible with a paper flyer in the real world. Also there is box 51 near the wall. Sound 55 appears to come from box 51. But sound 55 and sound 54 are both defined in flyer 53. If box 51 is removed, sound 55 still happens. Now it appears to come out of thin air. It is not coming from a "real" object in VR. Thus sound 55 cannot happen in the real world.

This also implies something akin to a new type of music notation, as suggested in FIG. 6. The "bitmap" portion of Card 61 is where the visuals might be defined for the card or for a cloth. Then there is a section of sound coming from "default", which can be taken to be the location of the card. Here there is a guitar (or several) and drums playing, plus a vocal track. There is an ambient background with a synthesizer playing. And at a relative location of (10, 20, 0, –5) there is a violin and cello playing. Here, the relative location is given in a coordinate system that could be fixed to the card. Or perhaps fixed to the VR site.

A reader experienced in playing and writing music can easily see the implications for more complex audio descriptions and interactions.

A card can play video. Plus the surface of the card need not be flat. A warping of the surface can easily be handled by transforming accordingly a flat video. Given the previous remarks about an audio signal, we can see that video (ie pure visual signal) can be accompanied by a complex audio track. See FIG. 7. This combines the audio of FIG. 6 with a video signal 72 that comes from a hypothetical YOUTUBE.™ video that was uploaded to that site. Item 73 is the audio that was previously in FIG. 6.

It is clear that FIG. 7 can easily be expanded to play 2 or more videos in the same card. But the reader should keep in mind that the computational limits for VR are severe. Caution is in order when designing a card. Perhaps only having 1 video per card.

Note that FIGS. 6 and 7 are pseudo-code. They are meant as hypothetical illustrative examples only.

A card can also be arbitrarily stretched in VR when it is, placed on a surface like a wall. FIG. 8 has parts A, B, C, D. Start at A. A card is placed on a wall. In part B, vertex 2 is stretched. In part C, vertex 1 is moved. In part D, vertex 3 is moved. The card is not a fixed shape physical card. VR permits the actions of FIG. 8.

Far more complex changes can be made than FIG. 8. But it shows the flexibility possible to a user and her avatar. There is no practical difference between what we call a card and what we call a cloth in VR.

A variant is where a card is transparent. It might have some text or images in a foreground color, and the background is transparent. This can make a card attract avatars near it, that unwittingly touch what they think is the underlying wall or post, but instead triggers a click to take them to another site. To combat this, when an avatar puts a flyer, as perhaps we can call it, on a board, the VR site can run diagnostics against it. If the flyer is effectively transparent, it is rejected by the site.

"Effectively transparent" can mean some minimum amount of the flyer must be visible. A flyer which is transparent over (eg) 30% or more of its area is rejected because of worries that the large clickable area which is not apparent can mislead users. Because that 30% invisible area means what is shown is the material underneath. The 30% invisible can contribute to another avatar scanning it and its user being unaware of the card/cloth.

This also suggests a mod to an avatar's eyes. When it looks at a scene, the avatar vision can be tuned to amplify images where a "front" image is just slightly different than a neighboring image.

A VR site might record instances of such rejected flyers. This can be important evidence if the site is being attacked.

A flyer with a link might be put on the ground. Some VR sites might disallow this, as it can be considered too likely to cause unwanted jumping to other sites. Especially if the flyer's colors make it likely to blend into the floor.

Another variant is where the card is effectively entirely transparent. This can mislead users.

Links can be classified in various ways. One way is by whether a link has to be interpreted by the VR site that it appears in, or whether this is done by an external server. The latter case allows for further narrowing, depending on that external server. Below, we suggest one possible classification.

3.0] Hardware Simulations;

The preceding remarks about a card playing audio and video suggest that a VR site with such cards can be used as a simulation test bed for designing hardware with those features. The virtual cards can be imagined as asymptotic instantiations of hardware devices. The VR rooms and avatars with the cards may be useful for this.

3.1] Link Interpreted by VR Site;

This site holds the link, which is now an outgoing link. The site always has a temptation to deny the link, so that users tend to remain on the site.

3.2] Link Interpreted by External Server;

3.2.1] External Server is a Clock;

A link is only active in a given time period or periods. That period is ascertained by looking up the universal clock. Because of the pervasive nature of the clock, this should always be true. If the time is such that the link should be valid, then any instance of the link will work. Otherwise the link is turned off. This is different than the expiration date. The active periods can be useful for making a site with many gadgets. There can be a market for a real world firm making such gadgets for VR sites.

3.2.2] External Server has Passwords;

The password server accepts an input of a password candidate. It returns true if the attempt is correct. False otherwise. This is for the case of one global password, same across VR sites. But a username can also be associated with the password. So the server now accepts a (username, password) pair.

I claim:

1. A method of anti-sexual harassment in Virtual Reality (VR) executed by a computer processor, comprising:
   providing, by the computer processor, a first VR site where avatars of different users can interact with each other;
   providing, by the computer processor, a second VR site where cacophonous sounds are playing;

wherein the first VR site and the second VR site are part of a metaverse;

providing, by the computer processor, a first avatar to a first user and a second avatar to a second user in the first VR site;

wherein the first avatar is female;

executing, by the computer processor of the VR site, source code instructions to make one or more portions of an outer surface of the first avatar into clickable link portions by associating a bitmap of the respective portion with a link, wherein the one or more clickable link portions comprise at least one of:

a portion covering breasts of the first avatar, a portion covering a groin of the first avatar, and a portion covering buttocks of the first avatar;

wherein determining that the second avatar interacts with one of the clickable link portions of the outer surface of the first avatar, the computer processor executes associated code of the link configured to initiate:

interrogating, by the computer processor, data associated with the second user to determine if the second user has a code to link analysis permitting the second avatar touch the one of the clickable link portions; and transporting the second avatar to the second VR site as a punishment for the second avatar user if the second user does not have the code to the link analysis, transport the second avatar to the second VR site as a punishment for the second avatar user.

2. The method of claim 1, where the cacophonous sounds comprises an audio simulating fingernails being dragged on a blackboard.

3. The method of claim 1, further comprising:

playing video including a psychedelic-type visual display in the second VR site.

4. The method of claim 1, where:

the first avatar wears a dress and bra and panties;

there is no clickable link on the dress;

there is a clickable link on the bra;

there is a clickable link on the panties;

such that when the second avatar directly touches the bra or the panties the second avatar is sent to the second VR site.

5. The method of claim 4, where the first avatar is a taxi dancer.

6. The method of claim 1, where the first avatar is a stripper with a vagina under clothing;

the first avatar designates her vagina to have a clickable link;

the first avatar undresses;

when the second avatar touches the vagina of the first avatar the second avatar is sent to the second VR site.

7. The method of claim 1, where the first avatar is a stripper with a buttocks under clothing;

the first avatar designates her buttocks to have a clickable link;

the first avatar undresses;

when the second avatar touches the buttocks of the first avatar the second avatar is sent to the second VR site.

8. The method of claim 1, where the first avatar is a stripper with an anus under clothing;

the first avatar designates her anus to have a clickable link;

the first avatar undresses;

when the second avatar touches the anus of the first avatar the second avatar is sent to the second VR site.

9. The method of claim 1, where the first avatar is a stripper with a vagina under clothing;

the first avatar designates her vagina to have a clickable link;

the first avatar undresses;

when the second avatar inserts a virtual banknote into the vagina of the first avatar but the second avatar does not touch the vagina of the first avatar, the second avatar is not sent to the second VR site.

* * * * *